US012770806B2

(12) United States Patent

Rehkopf et al.

(10) Patent No.: US 12,770,806 B2

(45) Date of Patent: Oct. 20, 2026

(54) METHOD FOR ACTUATING AN ON-LOAD TAP CHANGER, AND ON-LOAD TAP CHANGER DEVICE

(71) Applicant: Maschinenfabrik Reinhausen GmbH, Regensburg (DE)

(72) Inventors: Sebastian Rehkopf, Regensburg (DE); Andreas Sachsenhauser, Mallersdorf (DE); Konrad Rädlinger, Tegernheim (DE)

(73) Assignee: REINHAUSEN GMBH, Regensburg (DE)

( * ) Notice: Subject to any disclaimer, the term of this patent is extended or adjusted under 35 U.S.C. 154(b) by 69 days.

(21) Appl. No.: 18/876,222

(22) PCT Filed: Jun. 20, 2023

(86) PCT No.: PCT/EP2023/066608

§ 371 (c)(1),
(2) Date: Dec. 18, 2024

(87) PCT Pub. No.: WO2024/012816

PCT Pub. Date: Jan. 18, 2024

(65) Prior Publication Data

US 2025/0373155 A1 Dec. 4, 2025

(30) Foreign Application Priority Data

Jul. 14, 2022 (DE) ..................... 10 2022 117 589.8

(51) Int. Cl.

*H01H 9/56* (2006.01)
*H01H 9/00* (2006.01)

(52) U.S. Cl.

CPC ............ *H01H 9/56* (2013.01); *H01H 9/0038* (2013.01); *H01H 2009/0061* (2013.01); *H01H 2009/566* (2013.01)

(58) Field of Classification Search

CPC ................... H01H 9/0038; H01H 9/56; H01H 2009/0061; H01H 2009/566

See application file for complete search history.

(56) References Cited

U.S. PATENT DOCUMENTS

| | | | | |
|---|---|---|---|---|
| 3,735,243 | A | 5/1973 | Downs et al. | |
| 4,388,664 | A * | 6/1983 | Watanabe ............. | H02H 7/055 361/93.6 |

(Continued)

FOREIGN PATENT DOCUMENTS

| | | | |
|---|---|---|---|
| DE | 19530776 | C1 | 12/1996 |
| GB | 2435943 | A | 9/2007 |

*Primary Examiner* — Jue Zhang

(74) *Attorney, Agent, or Firm* — LEYDIG, VOIT & MAYER, LTD.

(57) ABSTRACT

A method for actuating an on-load tap-changer with a drive, a sensor and a control device is provided. The control device receives a switching command to actuate the on-load tap-changer. A starting time at which the switching command to actuate the on-load tap-changer was received in the current profile is determined. A temporal offset is added to the starting time to determine a time at which the actuation starts. A time of a next current zero crossing after the time at which the actuation starts is determined. A temporal difference between the time at which the actuation starts and the time of the next current zero crossing is determined. The temporal difference to the starting time in order to determine a new starting time for the actuation therefrom is determined and the actuation of the on-load tap-changer is started at the new starting time by the drive.

13 Claims, 4 Drawing Sheets

(56) References Cited

U.S. PATENT DOCUMENTS

| | | | | |
|---|---|---|---|---|
| 4,922,363 | A | 5/1990 | Long et al. | |
| 8,643,221 | B2 * | 2/2014 | Armstrong | H01H 9/0044 307/134 |
| 2007/0057652 | A1 * | 3/2007 | Hoffman | G05F 1/147 323/258 |
| 2008/0074073 | A1 * | 3/2008 | Genkawa | H02P 13/06 318/779 |

* cited by examiner

METHOD FOR ACTUATING AN ON-LOAD TAP CHANGER, AND ON-LOAD TAP CHANGER DEVICE

CROSS REFERENCE TO RELATED APPLICATIONS

This application is a U.S. National Phase application under 35 U.S.C. § 371 of International Application No. PCT/EP2023/066608, filed on Jun. 20, 2023, and claims benefit to German Patent Application No. DE 10 2022 117 589.8, filed on Jul. 14, 2022. The International Application was published in German on Jan. 18, 2024 as WO 2024/012816 A1 under PCT Article 21(2).

FIELD

The disclosure relates to a method for actuating an on-load tap-changer and to an on-load tap-changer device.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches or disconnecting switches.

For example, on-load tap-changers are used for uninterrupted switchover between different winding taps of an item of electrical equipment, such as a power transformer. For example, this makes it possible for the transmission ratio of the transformer or the inductance of the reactor to be changed.

On-load tap-changers are usually actuated by means of a combination of a motor-drive unit and a spring energy accumulator. The actuation takes place immediately after the switching command, i.e. at any time.

SUMMARY

In an embodiment, the present disclosure provides a method for actuating an on-load tap-changer with a drive, a sensor and a control device. The method includes receiving, by the control device, a switching command to actuate the on-load tap-changer. A current profile is detected by the sensor. A starting time at which the switching command to actuate the on-load tap-changer was received in the current profile is determined. A temporal offset is added to the starting time and to determine a time at which the actuation starts. A time of a next current zero crossing after the time at which the actuation starts is determined. A temporal difference between the time at which the actuation starts and the time of the next current zero crossing is determined. The temporal difference is added to the starting time in order to determine a new starting time for the actuation therefrom. The actuation of the on-load tap-changer is started at the new starting time by the drive.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
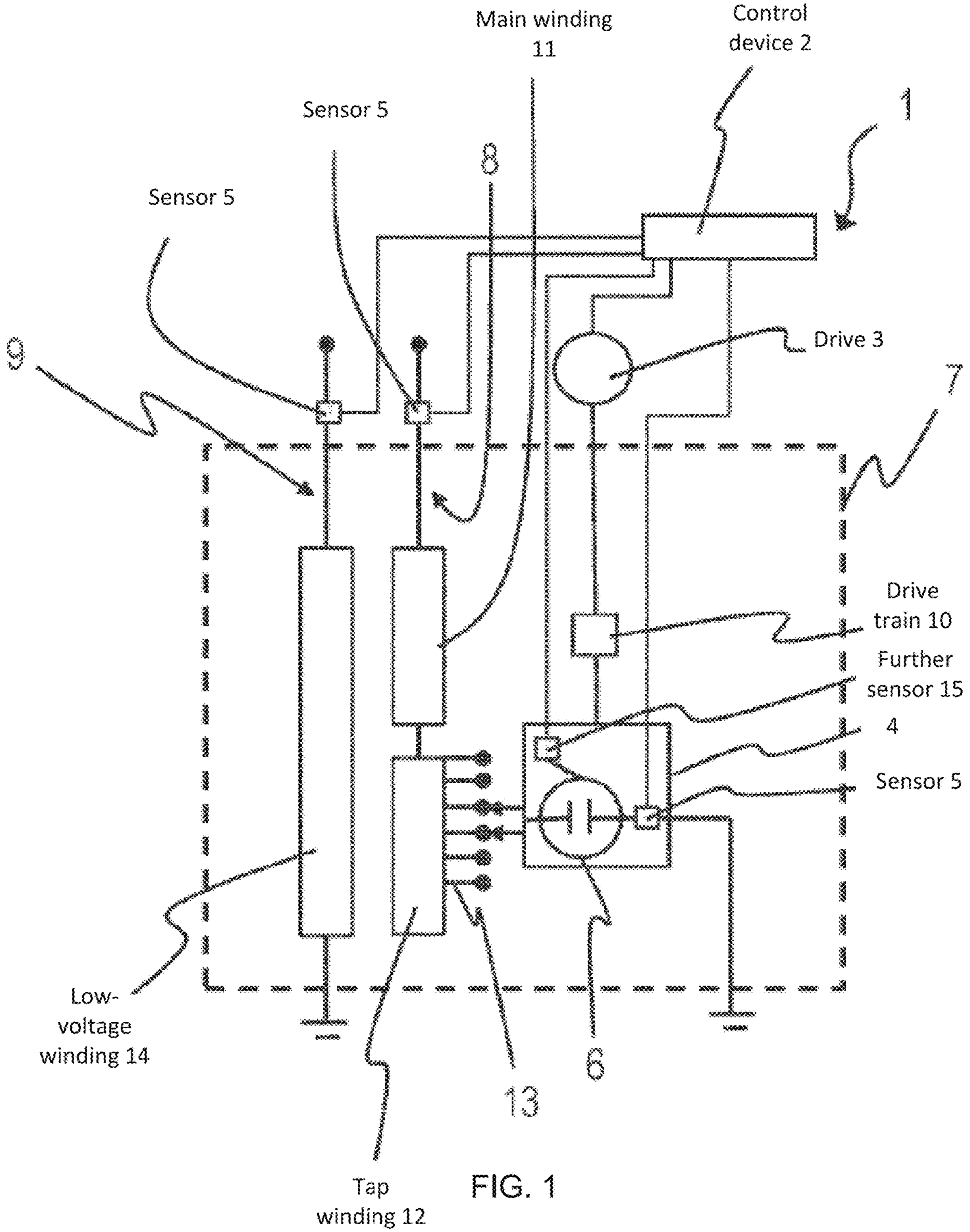
FIG. 1 shows a tap-changing transformer having an on-load tap-changer, according to embodiments of the present disclosure.

In accordance with an embodiment, the present disclosure specifies a method for actuating an on-load tap-changer, which is more accurate, checks the state of the on-load tap-changer before switchover and protects the vacuum interrupters.

The disclosure proposes a method for actuating an on-load tap-changer with a drive, a sensor and a control device, wherein

- a control device receives a switching command to actuate the on-load tap-changer;
- a current profile is detected via the sensor;
- a starting time at which the switching command to actuate the on-load tap-changer was received is determined in the current profile;
- a temporal offset is added to the starting time and a time at which the actuation would potentially start is determined therefrom;
- a time of a next current zero crossing after the time at which the actuation would potentially start is determined;
- a temporal difference between the time at which the actuation would potentially start and the time of the next current zero crossing is determined;
- the temporal difference is added to the starting time in order to determine a new starting time for the actuation therefrom;
- the actuation of the on-load tap-changer is started at the new starting time by means of the drive.

The method is based on the concept of monitoring the current profile within the on-load tap-changer, more precisely within a vacuum interrupter, and starting the actuation of the on-load tap-changer or the opening of the vacuum interrupter exactly at or shortly before the zero crossing of the current. This greatly reduces the burning time of the arc within the vacuum interrupter upon opening. This protects the vacuum interrupter and especially the contacts within the vacuum interrupter as much as possible. Precise opening or switching or actuation is made possible by virtue of the fact that future current zero crossings are predicted, among other things, and thus the opening or switching or actuation of the on-load tap-changer depends on this. Since the inertia of the drive train and thus the temporal offset between the switching command and actual actuation are known, these are matched to a future and suitable current zero crossing. Thus, the actual actuation does not start immediately after the switching command, but rather with a corresponding temporal offset, taking into account the temporal offset in the drive train. This takes into account the inertia (mechanics) of the drive train during actuation, with the result that the vacuum interrupter is always actuated at the current zero crossing or shortly before the current zero crossing. Actuation of the on-load tap-changer should also be understood as meaning the opening of a vacuum interrupter which is part of the on-load tap-changer.

A control unit is connected to the drive and at least one sensor. The control unit controls the drive which in turn actuates the on-load tap-changer. The control unit also detects the current profile via at least one sensor. The sensor detects a current profile and can be arranged at different locations, for example at a vacuum interrupter and/or at the on-load tap-changer and/or on the low-voltage side and/or high-voltage side of a tap-changing transformer.

The current profile before the switching command to actuate the on-load tap-changer can be detected in different ways; in particular, the frequency and the past current zero crossings can be determined and detected. The current profile is preferably evaluated in the control device.

The time of the next current zero crossing is a future current zero crossing and is based on the past current zero crossings of the current profile.

A future current zero crossing or all future current zero crossings is/are determined by one or more mathematical methods, in particular a fast Fourier transform. Furthermore, a future current zero crossing or all future current zero crossings can be determined by means of analog electronics.

The current profile can be detected, for example, by means of a sensor at a vacuum interrupter and/or on-load tap-changer and/or on the low-voltage side and/or high-voltage side of a tap-changing transformer.

The temporal offset is a value that is caused by or depends on the mechanics of the drive train. The value of the temporal offset can be adjusted automatically and/or manually. Furthermore, the value of the temporal offset can be adjusted on the basis of an arc burning time in the vacuum interrupter of the on-load tap-changer. Furthermore, the value of the temporal offset can be adjusted on the basis of an arc burning time of the past switching operations of the on-load tap-changer in the vacuum interrupter of the on-load tap-changer.

Once the temporal offset has been determined, a further temporal offset can be subtracted in order to thereby shift the new starting time. This means that the actuation of the on-load tap-changer is not started before the zero crossing, but rather at an earlier time which is not the time of a next current zero crossing.

The control device may be designed in any manner and in particular may comprise means which control a drive in order to actuate the on-load tap-changer and carry out the method according to the disclosure.

Furthermore, the disclosure proposes an on-load tap-changer device comprising:

- an on-load tap-changer;
- a sensor;
- a drive;
- a control device;

wherein

- the control device is configured
- to receive a switching command to actuate the on-load tap-changer;
- to detect a current profile via the sensor;
- to determine a starting time at which the switching command to actuate the on-load tap-changer was received in the current profile;
- to add a temporal offset to the starting time and to determine a time at which the actuation would potentially start therefrom;
- to determine a time of a next current zero crossing after the time at which the actuation would potentially start;
- to determine a temporal difference between the time at which the actuation would potentially start and the time of the next current zero crossing;
- to add the temporal difference to the starting time and to determine a new starting time for the actuation therefrom;
- to start the actuation of the on-load tap-changer at the new starting time by means of the drive.

The on-load tap-changer device, consisting of an on-load tap-changer with a vacuum interrupter, a drive, a sensor and a control device, allows the temporal offset of the mechanics to be taken into account during a diverter switch operation and thus to open a vacuum interrupter at the current zero crossing.

Furthermore, the on-load tap-changer device may have a further sensor for measuring the arc burning time.

FIG. 1 shows an on-load tap-changer device 1 for carrying out a diverter switch operation. The on-load tap-changer device 1 comprises a control device 2, at least one sensor 5 and an on-load tap-changer 4. The control device 2 is connected to a drive of the on-load tap-changer 4. The control device 2 is configured and designed to control the drive 3 so that the latter actuates the on-load tap-changer 4. Furthermore, the control device 2 is connected to a sensor 5 or a plurality of sensors 5 which measure(s) a current flowing through a vacuum interrupter 6 and thus through the on-load tap-changer 4 of a tap-changing transformer 7. The control device 2 is designed and configured to measure and evaluate the current detected by the sensor 5 or the sensors 5. In particular, the control device 2 determines the current profile, i.e. when the current has or assumes the value zero and at what frequency this happens. The sensor 5 may be arranged, for example, at the tap-changing transformer 7, in particular on the high-voltage side 8 or the low-voltage side 9. Furthermore, a sensor 5 may be arranged in the on-load tap-changer 4, directly at the vacuum interrupter 6 or at any other position which is suitable for detecting the profile of the current.

The control device 2 is further designed and configured to predict and/or calculate future current zero crossing times. The control unit 2 therefore accordingly comprises a computing unit and/or a processor and/or a memory.

The drive 3 is mechanically connected, via a drive train 10, to the on-load tap-changer 4 and thus also to the vacuum interrupter 6. The drive train 10 is understood as meaning the sum of the mechanical elements or mechanics between the motor-drive unit 3 and the vacuum interrupter 6, such as shafts, toggle levers, rollers, etc.

The control device 2 can be arranged as a stand-alone device on the tap-changing transformer 7 or in a control room. Furthermore, the control device 2 may be a part of a drive controller of the on-load tap-changer 4 or formed as part of a voltage regulator. The control device 2 is designed and configured to control the drive 3.

Furthermore, a further sensor 15 is provided and is connected to the control device 2. The further sensor 15 is configured and designed to detect an arc burning time in the vacuum interrupter 6. The control device 2 then evaluates the detected arc burning time. Ideally, the vacuum interrupter 6 is opened at the current zero crossing, with the result that no arc is generated inside the vacuum interrupter 6 and the arc burning time is equal to zero. If the vacuum interrupter 6 is actuated while a current is still flowing through the vacuum interrupter 6, an arc is generated until it is interrupted and extinguished. This arc burning time therefore also depends on the temporal offset TV. Therefore, the arc burning time from past switching operations is also used to adjust the temporal offset TV. Evaluation and adjustment are carried out in the control device 2.

The tap-changing transformer 7 has a main winding 11 and a tap winding 12. The on-load tap-changer 4 is connected to the tap winding 12 via the winding taps 13. The main winding 11 and the tap winding 12 are arranged on the high-voltage side 8 (in rare cases also on the low-voltage side). Furthermore, the tap-changing transformer 10 has a low-voltage winding 14 which is inductively coupled to the main winding 11 and the tap winding 12.

Figure 2:
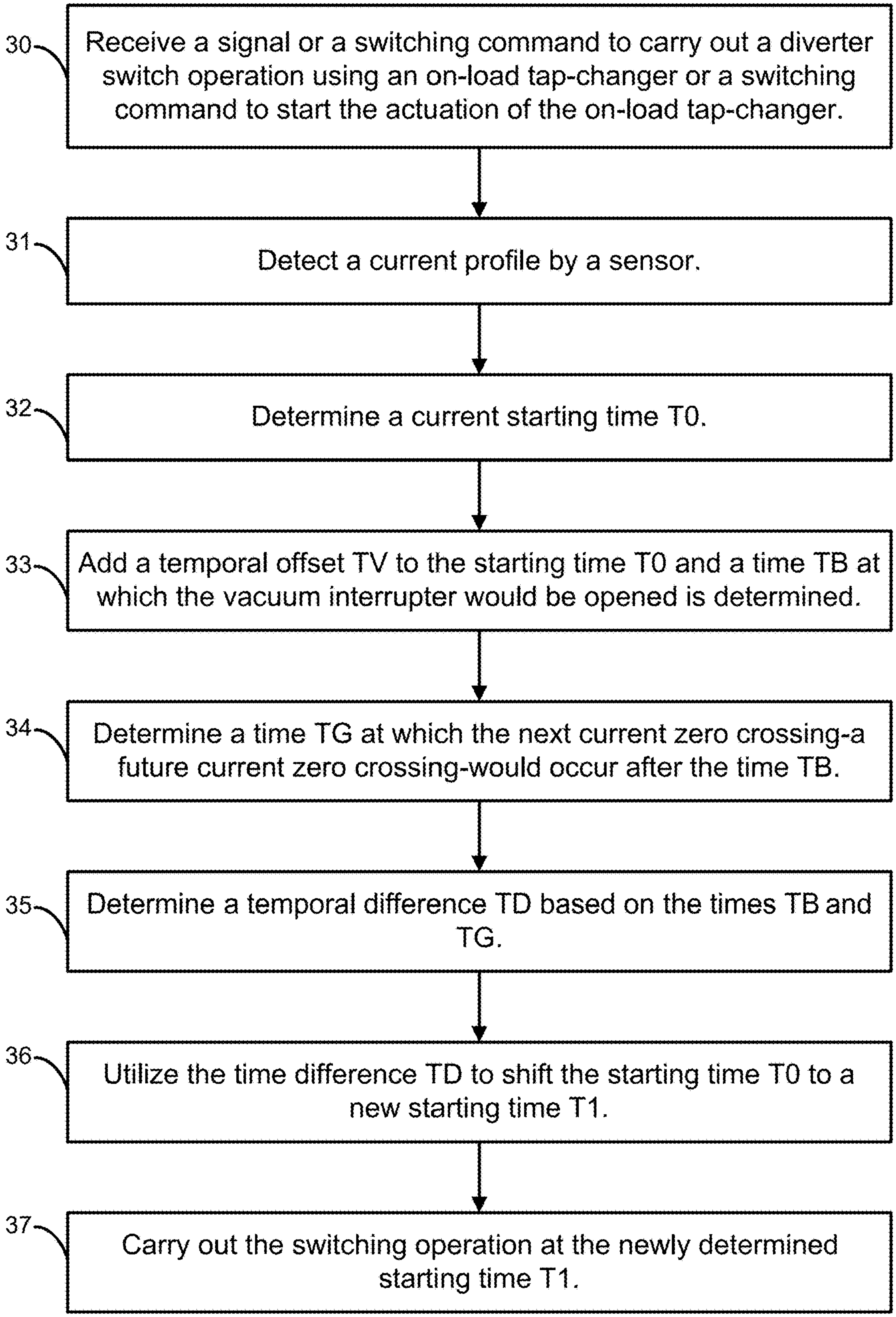
FIG. 2 shows a method sequence, according to embodiments of the present disclosure.

FIG. 2 shows a flowchart of a method for carrying out a diverter switch operation by means of an on-load tap-changer 4. In a first step 30, the control device 2 receives a signal or a switching command to carry out a diverter switch operation by means of an on-load tap-changer or a switching command to start the actuation of the on-load tap-changer 4. For example, the signal or the switching command is generated manually or by a voltage regulator.

In the next step 31, a current profile is detected by means of a sensor 4; in particular, it is determined when the current that flows through the vacuum interrupter 5 of the on-load tap-changer 4 has or assumes the value zero and at what frequency F this happens. The past current zero crossing times and their distances from each other are determined. This is carried out constantly during operation of the tap-changing transformer, especially already before the switching command and before the start of the actuation of the on-load tap-changer. Ideally, the current has a sinusoidal profile, thus resulting in regular current zero crossings. Based on the times from the past or on the past current zero crossings, the future current zero crossings or the times are then predicted in the current profile. This can be carried out in a wide variety of ways, for example by calculation with mathematical methods such as a fast Fourier transform. These calculations are carried out in the control unit 2 which is designed and configured for this purpose. The control unit 2 therefore accordingly comprises a computing unit and/or a processor and/or a memory. The current and future current zero crossing times are determined by means of a signal from the sensor which, according to its configuration, samples or outputs only current zero crossings or the entire sinusoidal profile.

In the next step 32, the current starting time T0 is determined. This starting time T0 corresponds to the time at which the signal for actuating the on-load tap-changer 4 was generated in the control device 2 or received by the control device 2. This is depicted in the profile of the current. Since the drive train 10 has a temporal offset TV caused by the mechanics, this must be taken into account when actuating the on-load tap-changer 4 or opening the vacuum interrupter 6. The offset TV caused by the mechanics is prescribed by the structural implementation of the drive train 10. This includes, for example, the rotary movement of a cam or a lever, which must first cover a distance, for example, until a force or transfer of motion to the vacuum interrupter 6 can take place, for example. Due to these mechanical conditions, the vacuum interrupter 6 is not actuated or opened immediately after the signal for actuation or at the beginning, but rather with the corresponding temporal offset TV. However, the aim of each actuation of the on-load tap-changer 4 is to open the vacuum interrupter 6 at the current zero crossing or at a proximate time, i.e. shortly before the current zero crossing. Since the information relating to the future current zero crossing times or current zero crossings, the starting time T0 and the offset TV are known in the control device 2, a corresponding starting time T1 is calculated for the start of the switching operation. In other words, actuation is started only when there is a current zero crossing in the vacuum interrupter 6 at the end of the temporal offset TV of the drive train 10. In the next step 33, the temporal offset TV is added to the starting time T0 and thus the time TB at which the vacuum interrupter 6 would actually be opened is determined.

In a next step 34, the time TG at which the next current zero crossing-a future current zero crossing-would occur after the time TB of the potential start of the actuation is determined. Based on the times TB and TG, a temporal difference TD between these times is determined in the next step 35. This difference TD is in turn used to shift the starting time T0 to a new starting time T1 in the next step 36.

In the last step 37, the switching operation is started or carried out at the newly determined starting time T1. Here, the drive 3 is controlled by the control unit 2.

The temporal offset TV has a value of a few milliseconds that is adjusted to the drive train 10. This value can either be fixed or adjusted. The adjustment can be effected automatically or manually. An adjustment can be useful, for example, if wear occurs in the drive train or parts are replaced. Furthermore, the arc burning time can also be used to adjust the temporal offset.

Figure 3:
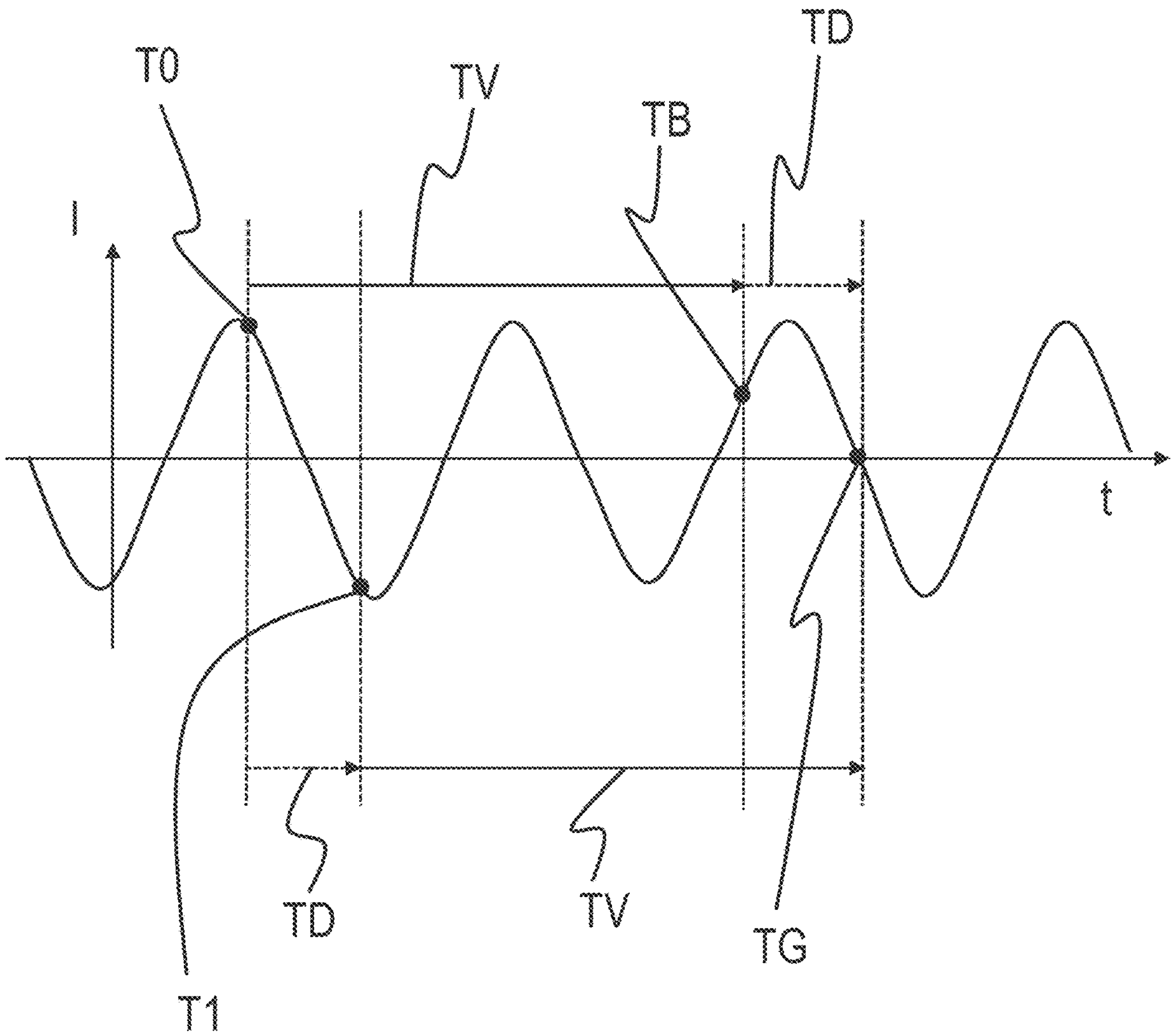
FIG. 3 shows a diagram for explaining the method, according to embodiments of the present disclosure.

FIG. 3 is used to illustrate the method according to the invention. The temporal current profile (in ms) within a closed vacuum interrupter 6 or the on-load tap-changer 4 is plotted on the X-axis. The Y-axis indicates the level of the current in A. The profile of the current or the current profile is sinusoidal or approximately sinusoidal here. The curve of the current profile intersects the X-axis at the zero crossings (current zero crossings). At these times, no current therefore flows through the vacuum interrupter 6 or the on-load tap-changer 4. At any time T0, a switching command to actuate or to start the actuation of the on-load tap-changer 4 is received in the control unit 2. This time is assumed to be the possible starting time T0 of a diverter switch operation. Starting from this starting time T0, the temporal offset TV is added to this starting time T0. This temporal offset TV basically has a fixed value. After the temporal offset TV has been added to the starting time T0, a time TB at which the actuation or opening of the vacuum interrupter 6 would potentially start is obtained. However, since a current is still flowing here, that is to say the current is not zero, arcs would occur when actuating the vacuum interrupter 6, especially when opening the vacuum interrupter 6. But this is precisely what should be avoided.

As shown in the diagram, the time TB at which the actuation would potentially start is not at a current zero crossing. Therefore, a suitable time TG at which no current would flow through the vacuum interrupter 6 upon opening is determined. This time TG is the next current zero crossing coming after the time TB. The next current zero crossing is determined on the basis of past current zero crossings.

Based on the time TB of the potential start of the opening or actuation and the appropriate time TG, the period of time TD between these two points is calculated, for example as a difference. This period of time TD is then added to the starting time T0 and then forms the new starting time T1 at which the actual actuation or opening is then started. This ensures that the opening or actuation of the vacuum interrupter 6 starts at the current zero crossing.

Figure 4:
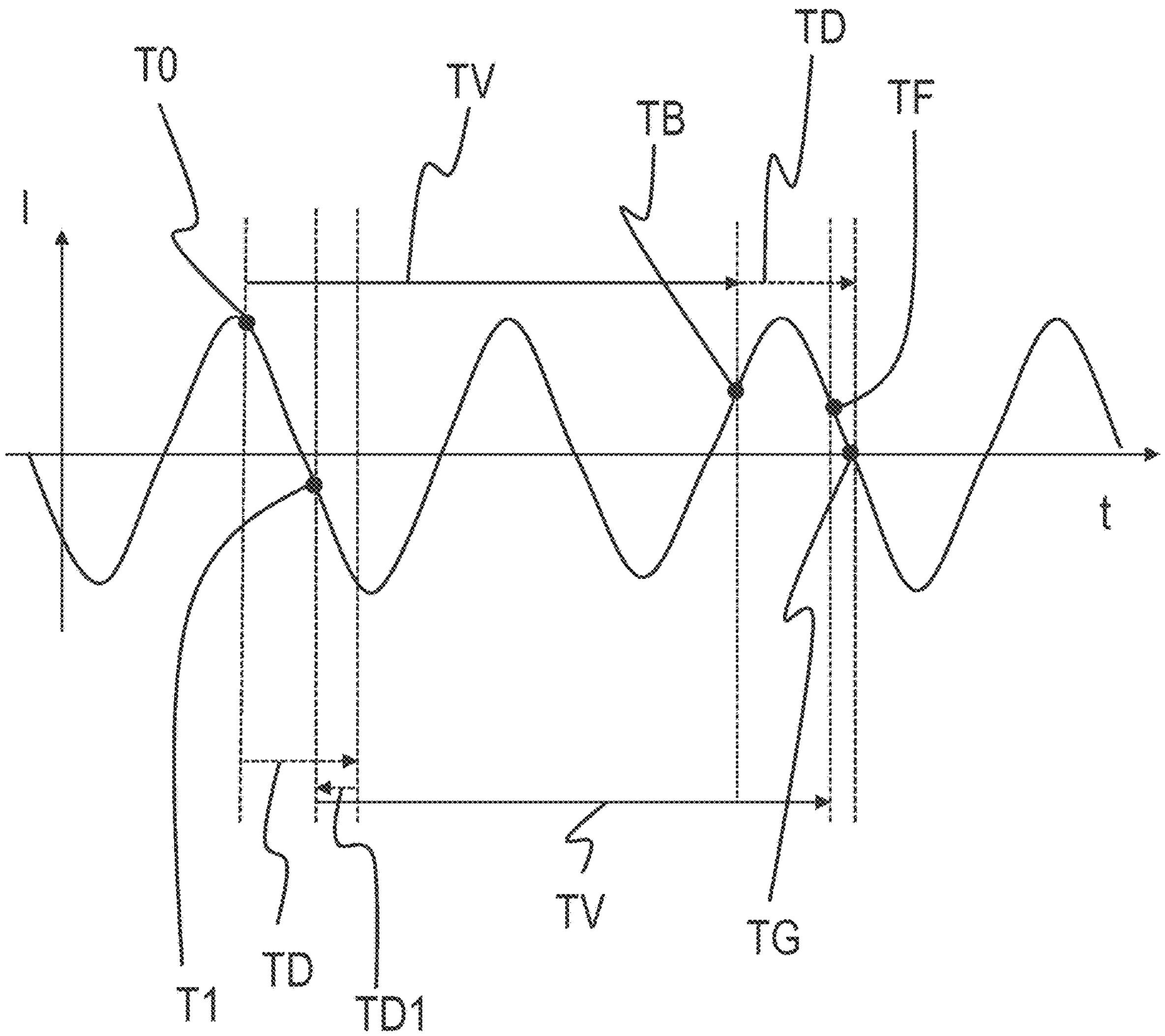
FIG. 4 shows a further diagram for explaining the method, according to embodiments of the present disclosure.

According to another embodiment in FIG. 4, once the temporal offset TV has been determined, a further offset TD1 is subtracted. This offset TD1 ensures that the opening of the vacuum interrupter does not start immediately at the current zero crossing, but rather at an earlier time (TF) by a few milliseconds, i.e. shortly before.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 On-load tap-changer device
2 Control device
3 Drive
4 On-load tap-changer
5 Sensor
6 Vacuum interrupter
7 Tap-changing transformer
8 High-voltage side
9 Low-voltage side
10 Drive train
11 Main winding
12 Tap winding
13 Winding taps
14 Low-voltage winding
15 Further sensor
T0 Starting time
T1 New starting time
TV Temporal offset
TD1 Further offset
TB Time at which the actuation would potentially start
TG Time of the next current zero crossing
TD Temporal difference
TF Earlier time
F Frequency

The invention claimed is:

1. A method for actuating an on-load tap-changer with a drive, a sensor and a control device, wherein:
- receiving, by the control device, a switching command to actuate the on-load tap-changer;
- detecting, by the sensor, a current profile;
- determining a starting time at which the switching command to actuate the on-load tap-changer was received in the current profile;
- adding a temporal offset to the starting time to determine a time at which the actuation starts;
- determining a time of a next current zero crossing after the time at which the actuation starts;
- determining a temporal difference between the time at which the actuation starts and the time of the next current zero crossing;
- adding the temporal difference to the starting time in order to determine a new starting time for the actuation therefrom;
- starting the actuation of the on-load tap-changer at the new starting time by the drive.

2. The method for actuating the on-load tap-changer as claimed in claim 1, further comprising;
- detecting the current profile before the switching command to actuate the on- load tap-changer;
- determining frequency and past current zero crossings when detecting the current profile.

3. The method for actuating the on-load tap-changer as claimed in claim 2, wherein:
- the time of the next current zero crossing is a future current zero crossing based on the past current zero crossings of the current profile.

4. The method for actuating the on-load tap-changer as claimed in claim 3, wherein:
- the future current zero crossing is determined by a mathematical method, or by means of analog electronics.

5. The method for actuating the on-load tap-changer as claimed in claim 4, wherein the mathematical method is a fast Fourier transform.

6. The method for actuating an-the on-load tap-changer changer as claimed in claim 1, wherein;
- the current profile is detected by one or more sensors at a vacuum interrupter and/or on-load tap-changer and/or on the low-voltage side and/or high-voltage side of a tap-changing transformer.

7. The method for actuating the on-load tap-changer as claimed in claim 1, wherein;
- the temporal offset is a value that is caused by or depends on mechanics of a drive train.

8. The method for actuating the on-load tap-changer as claimed in claim 7, wherein:
- the value of the temporal offset is adjusted automatically and/or manually.

9. The method for actuating the on-load tap-changer as claimed in claim 8, wherein;
- the value of the temporal offset is adjusted based on an arc burning time in a vacuum interrupter of the on-load tap-changer.

10. The method for actuating the on-load tap-changer as claimed in claim 1, wherein;
- once the temporal offset has been determined, a further temporal offset is subtracted and thus the new starting time is shifted and the actuation of the on-load tap-changer is started before zero crossing at an earlier time that is not the time of the next current zero crossing.

11. The method for actuating the on-load tap-changer as claimed in claim 1, wherein:
- the control device controls the drive which actuates the on-load tap-changer.

12. An on-load tap-changer device comprising:
- an on-load tap-changer;
- a sensor;
- a drive;
- a control device;

wherein
- the control device is configured to:

receive a switching command to actuate the on-load tap-changer;

detect a current profile via the sensor;

determine a starting time at which the switching command to actuate the on-load tap-changer was received in the current profile;

add a temporal offset to the starting time and to determine a time at which the actuation starts;

determine a time of a next current zero crossing after the time at which the actuation starts;

determine a temporal difference between the time at which the actuation starts and the time of the next current zero crossing;

add the temporal difference to the starting time to determine a new starting time for the actuation therefrom;

start the actuation of the on-load tap-changer at the new starting time by means of the drive.

13. The on-load tap-changer device as claimed in claim 12, comprising a further sensor for measuring an arc burning time.

* * * * *